(12) United States Patent
Kim et al.

(10) Patent No.: US 11,345,217 B2
(45) Date of Patent: May 31, 2022

(54) APPARATUS FOR AIR VENT OF VEHICLE

(71) Applicants: HYUNDAI MOTOR COMPANY, Seoul (KR); KIA MOTORS CORPORATION, Seoul (KR); NIFCO KOREA INC., Ansan-si (KR); HYUNDAI MOBIS CO., LTD., Seoul (KR)

(72) Inventors: Tae Kun Kim, Ansan-si (KR); Young Su Nam, Seoul (KR); Dong Won Yeon, Hwaseong-si (KR); Ie Seob Park, Incheon (KR); Sung Kwon Kim, Asan-si (KR)

(73) Assignees: HYUNDAI MOTOR COMPANY, Seoul (KR); KIA MOTORS CORPORATION, Seoul (KR); NIFCO KOREA INC., Asan-si (KR); HYUNDAI MOBIS CO., LTD., Seoul (KR)

( * ) Notice: Subject to any disclaimer, the term of this patent is extended or adjusted under 35 U.S.C. 154(b) by 133 days.

(21) Appl. No.: 16/839,321

(22) Filed: Apr. 3, 2020

(65) Prior Publication Data
US 2020/0317031 A1    Oct. 8, 2020

(30) Foreign Application Priority Data

Apr. 4, 2019   (KR) .................. 10-2019-0039639

(51) Int. Cl.
*B60H 1/34*    (2006.01)
*B60H 1/00*    (2006.01)

(52) U.S. Cl.
CPC ......... *B60H 1/3421* (2013.01); *B60H 1/0065* (2013.01); *B60H 1/00671* (2013.01)

(58) Field of Classification Search
CPC . B60H 1/3421; B60H 1/0065; B60H 1/00671
(Continued)

(56) References Cited

U.S. PATENT DOCUMENTS

| 10,071,615 | B2 | 9/2018 | Rottmann |
| 2011/0319005 | A1* | 12/2011 | Sawada ............. B60H 1/00678 454/155 |

(Continued)

FOREIGN PATENT DOCUMENTS

| DE | 102014219081 A1 | 1/2016 |
| DE | 102016107227 A1 | 10/2017 |

(Continued)

*Primary Examiner* — Vivek K Shirsat
(74) *Attorney, Agent, or Firm* — McDonnell Boehnen Hulbert & Berghoff LLP

(57) ABSTRACT

Disclosed herein is an air vent device, the air vent device including a garnish including an opening in which an air vent hole is located, a grille unit located between an outer surface of the air vent hole and an inner surface of the garnish, a first wing located at an outer side of the air vent hole in a lateral direction and configured to be pivoted based on one end of the grille unit, a deco part located on an outer surface of the garnish, and a knob configured to control a direction of a wind discharged from the air vent hole, wherein the knob is located to surround a portion of the deco part and configured to be capable of controlling a direction of a wind in a vertical direction by operating the first wing.

10 Claims, 7 Drawing Sheets

(58) Field of Classification Search
USPC ........................................................ 454/155
See application file for complete search history.

(56) References Cited

U.S. PATENT DOCUMENTS

2019/0084379 A1   3/2019  Fujisawa et al.
2019/0366807 A1*  12/2019 Frisch .................... B29C 48/12

FOREIGN PATENT DOCUMENTS

| DE | 102015017008 B4 | 2/2018 |
| EP | 3321114 A1 | 5/2018 |
| KR | 20070050874 A | 5/2007 |
| KR | 2012-0021372 A | 3/2012 |
| KR | 2016-0004931 A | 1/2016 |
| KR | 10-1701621 B1 | 2/2017 |
| KR | 2018-0070200 A | 6/2018 |

* cited by examiner

CROSS SECTION TAKEN ALONG LINE A-A

CROSS SECTION TAKEN ALONG LINE B-B

CROSS SECTION TAKEN ALONG LINE A-A

CROSS SECTION TAKEN ALONG LINE B-B

APPARATUS FOR AIR VENT OF VEHICLE

CROSS REFERENCE TO RELATED APPLICATIONS

This application claims under 35 U.S.C. § 119(a) the benefit of priority to Korean Patent Application No. 10-2019-0039639 filed on Apr. 4, 2019, the entire contents of which are incorporated herein by reference.

BACKGROUND

(a) Technical Field

The present disclosure relates to an air vent device. More particularly, it relates to an air vent device including a deco part disposed in and fixed to a garnish inside a vehicle, providing a first wing configured to be pivoted based on a grille unit located between the garnish and an air vent hole, thereby allowing the deco part, which is configured to surround the garnish even when the first wing is pivoted in a vertical direction, to maintain a predetermined position.

(b) Background Art

Conventionally, an air vent device having a form, in which a number of second wing plates are vertically arranged and installed in a discharge direction of an air vent hole having a discharge port provided in a front side, a number of first wing plates are laterally arranged and installed at an outer side of an air vent housing, wind direction control knobs are installed on first wings and one second wing to be movable in a lateral direction and a vertical direction, is mainly used in a vehicle.

In the conventional air vent device of the vehicle, when the wind direction control knobs are vertically moved, since each first wing is inclined upward or downward, a direction of air discharged to the discharge port of the air vent hole is controlled in the vertical direction, and, when the wind direction control knobs are laterally moved, since each second wing is inclined in a left direction or a right direction, the direction of the air discharged through the discharge port of the air vent hole is controlled in the lateral direction.

However, since the conventional air vent device of the vehicle is comprised of a plurality of parts so as to install the wind direction control knobs on the first wings to be movable in the lateral direction, many required parts are necessary so that manufacturability and assemblability are difficult, a production cost is high, and an operation is not smooth.

Further, when vertical wind direction control of the first wing is performed in a state in which the first wing is opened, since an outermost surface of the first wing exposed to an interior of the vehicle is increased, there is a problem of aesthetic appearance.

SUMMARY

The present disclosure has been made in an effort to solve the above-described problems associated with prior art.

In one aspect, the present disclosure provides a deco part located on an outermost surface of a garnish to provide aesthetic stability through the deco part which maintains a fixed shape even in vertical wind control.

In another aspect, the present disclosure provides a knob configured to integrally surround a portion of a grille unit and the deco part to provide an assembly structure with improved workability Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

An air vent device for achieving the above-described objectives of the present disclosure includes the following configuration.

In a preferred embodiment, the present disclosure provides an air vent device of a vehicle, which includes a garnish including an opening in which an air vent hole is located, a grille unit located between an outer surface of the air vent hole and an inner surface of the garnish, a first wing located at an outer side of the air vent hole along a width of a vehicle in one direction and configured to be pivoted based on one end of the grille unit, a deco part located on an outer surface of the garnish, and a knob configured to control a direction of a wind discharged from the air vent hole.

Further, the knob may be configured to be engaged with a second wing located inside the air vent hole in a direction crossing the first wing.

Further, the air vent device may further include an engagement part located on an inner side of the knob, and the engagement part may be configured to be coupled to a portion of the second wing.

Further, the deco part may be configured to surround at least a portion of an outermost surface of the first wing.

Further, the air vent device may further include an insertion part located on the outermost surface of the first wing, and a central part of the grille unit may be configured to be inserted into and engaged with the insertion part.

Further, the first wing may be configured to be pivotable based on the central part.

Further, the knob may be located to surround the central part and a portion of the deco part located in the opening.

Further, separation lines formed between a plurality of separated portions constituting the deco part may be configured to be located inside the knob.

In another preferred embodiment, the present disclosure provides an air vent device of a vehicle, which includes a garnish including an opening in which an air vent hole is located, a grille unit located between an outer surface of the air vent hole and an inner surface of the garnish, a first wing located at an outer side of the air vent hole along a width of a vehicle in one direction and configured to be pivoted based on one end of the grille unit, a deco part located on an outer surface of the garnish, and a knob configured to control a direction of a wind discharged from the air vent hole, wherein a height of a cross section of the deco part configured to extend from an outermost surface of the first wing is configured to be lower along a direction in which the deco part extends.

Further, separation lines formed between a plurality of separated portions constituting the deco part may be configured to be located inside the knob.

Further, the air vent device may further include an insertion part located on the outermost surface of the first wing, and a central part of the grille unit may be configured to be inserted into and engaged with the insertion part.

Further, the first wing may be configured to be pivotable based on the central part.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
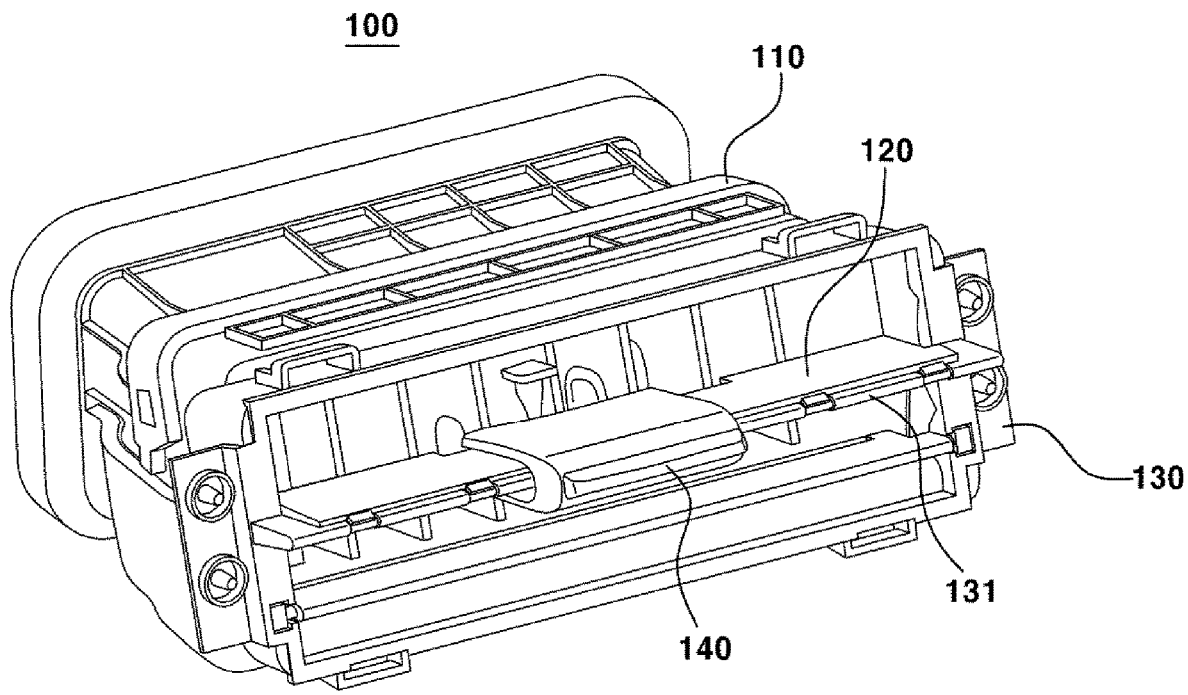
FIG. 1 is a diagram illustration a configuration of an air vent hole assembly of an air vent device according to one embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail with reference to the accompanying drawings. The embodiments of the present disclosure can be modified in various forms, and the scope of the present disclosure should not be construed as being limited to the following embodiments. These embodiments are provided to more fully describe the present disclosure to those skilled in the art.

The terms "~ part," "~ device," "~ assembly," and the like used herein mean a unit for processing at least one function or operation, and this unit may be implemented by hardware or a combination thereof.

Further, a "first wing" and a "second wing" may be described herein as one unit including one or more plates.

Further, in the present specification, a "front" means a front surface of a vehicle, and a "rear" means a rear surface of the vehicle as relative positions.

Further, in the present specification, it may be construed that an "inner side" and an "inner surface" of an air vent hole mean positions close to the front surface of the vehicle, and an "outer side" and an "outer surface" thereof mean positions close to the rear surface of the vehicle The present disclosure includes a grille unit 130 located in an opening of an air vent hole 110 and a central part 131 located in the grille unit 130 and is configured such that an insertion part 121 of a first wing 120 is inserted into the central part 131 so that one end at which the insertion part 121 of the first wing 120 is located is pivoted based on the central part 131, and a deco part 210 is located to surround the opening of the air vent hole 110 and at least a portion of a garnish 200 on an outer surface of the air vent hole 110.

An air vent device, in which a surface exposed to an interior space of a vehicle is consistently maintained even in an operation of a knob 140 in vertical and lateral positions through the deco part 210 having a shape fixed to the garnish 200, is provided.

Figure 2:
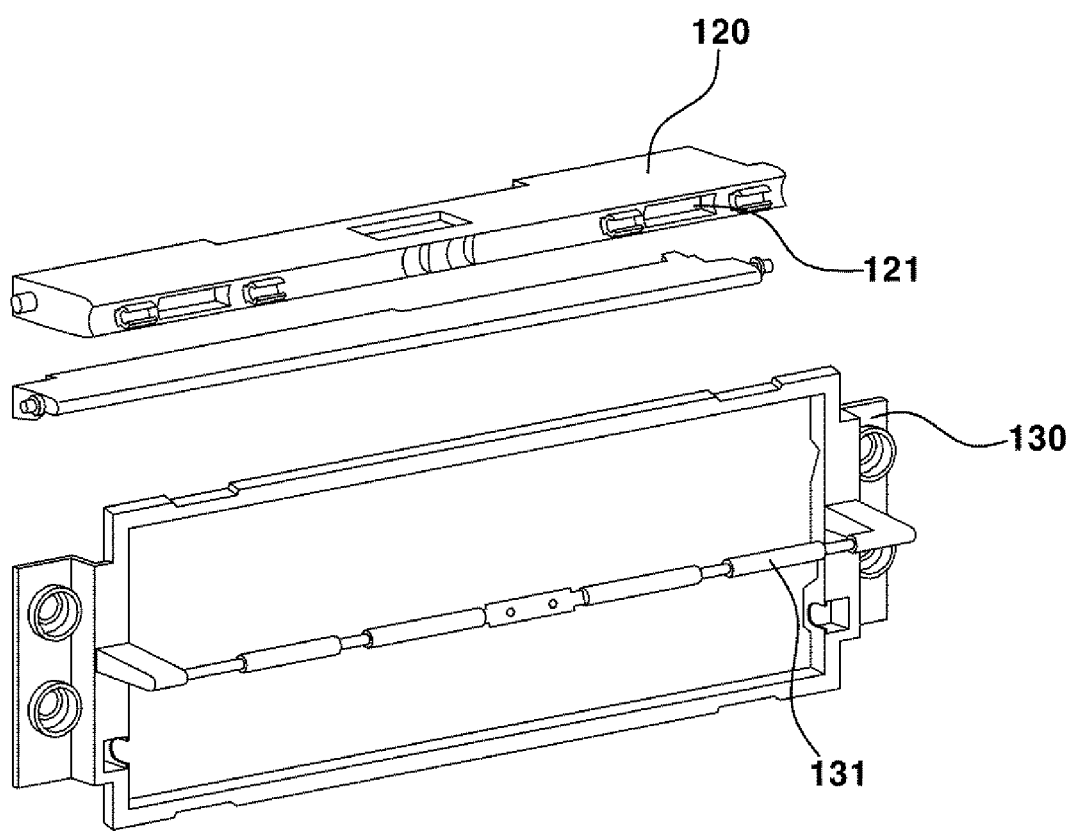
FIG. 2 is a diagram illustrating configurations of a grille unit and a first wing according to one embodiment of the present disclosure.

FIGS. 1 to 3 illustrate a configuration of the air vent device of the present disclosure.

In FIG. 1, an air vent hole assembly 100 of the present disclosure includes the air vent hole 110 having a passage in a length direction of the vehicle, and an opening hole provided at a position facing the air vent hole 110 and the vehicle. Further, the air vent hole assembly 100 includes the first wing 120 comprised of one or more plates located at an outer side of the air vent hole 110 in one direction of the air vent hole 110, and a second wing 160 (shown in FIGS. 4A and 4C) located at an inner side of the air vent hole 110 and comprised of one or more plates configured to have a predetermined angle with respect to the first wing 120 to intersect the first wing 120.

The first wing 120 is configured to be capable of controlling a direction of a discharged wind in a vertical direction through a vertical operation of the knob 140, and the second wing 160 is configured to be capable of controlling the direction of the discharged wind in a lateral direction through a lateral operation of the knob 140.

Preferably, the first wing 120 may be configured to be located in the lateral direction with respect to the opening of the air vent hole 110, and the second wing 160 may be configured to be located in a vertical direction with respect to the opening of the air vent hole 110.

More preferably, the first wing 120 and the second wing 160 may be comprised of a plurality of plates and connected to each other through a linkage (not shown) so that the first wing 120 and the second wing 160 may be pivotably rotated in the same direction by being interlocked with the operation of the knob 140.

FIG. 2 illustrates the grille unit 130 configured to surround the opening of the air vent hole 110 on the outer surface of the air vent hole 110 and extending in the lateral direction with respect to the opening of the air vent hole 110.

The grille unit 130 is configured to be located between a garnish 200 and an outer surface of an edge of the opening of the air vent hole 110 and configured to surround a circumference of the opening of the air vent hole 110. Further, the air vent hole assembly 100 includes the central part 131 configured to be located in the lateral direction with respect to the opening of the air vent hole 110.

A rear surface of the grille unit 130 may be configured to be fixed to the air vent hole 110, and an outer surface thereof may be configured to face a rear surface of the garnish 200 including the deco part 210.

The central part 131 of the grille unit 130 is configured to face an outermost surface of at least one plate constituting the first wing 120 and configured to be engaged with the insertion part 121 located on the outermost surface of the plate.

More preferably, since the first wing 120 is configured to be pivoted based on the central part 131, one end of the first wing 120 is configured to be vertically pivoted based on the other end of the first wing 120, at which the insertion part 121 is located, according to movement of the knob 140.

Since the insertion part 121 is configured to be inserted into and located in the central part 131, the insertion part 121 and the central part 131 are configured to maintain a predetermined gap so that the first wing 120 is pivotable along a surface of the central part 131.

Preferably, the central part 131 may be configured to be forcibly fitted into the insertion part 121, and the insertion part 121 engaged with the insertion part 121 may include a predetermined gap so as to be freely pivoted vertically.

More preferably, a cross section of the central part 131 may be configured in a cylindrical shape, and the insertion part 121 includes a circular cross section of which at least a portion is open and inserted into the central part 131 through forcible fitting.

The knob 140 is configured to surround one or more plates constituting the first wing 120, a central portion facing the first wing 120, and the deco part 210 located at the garnish 200.

More preferably, the knob 140 includes an engagement part 143 provided on an inner surface of the knob 140 and engaged with the second wing 160 located in the vertical direction so that both operations of the first wing 120 and the second wing 160 are possible through one knob 140.

Figure 3A:
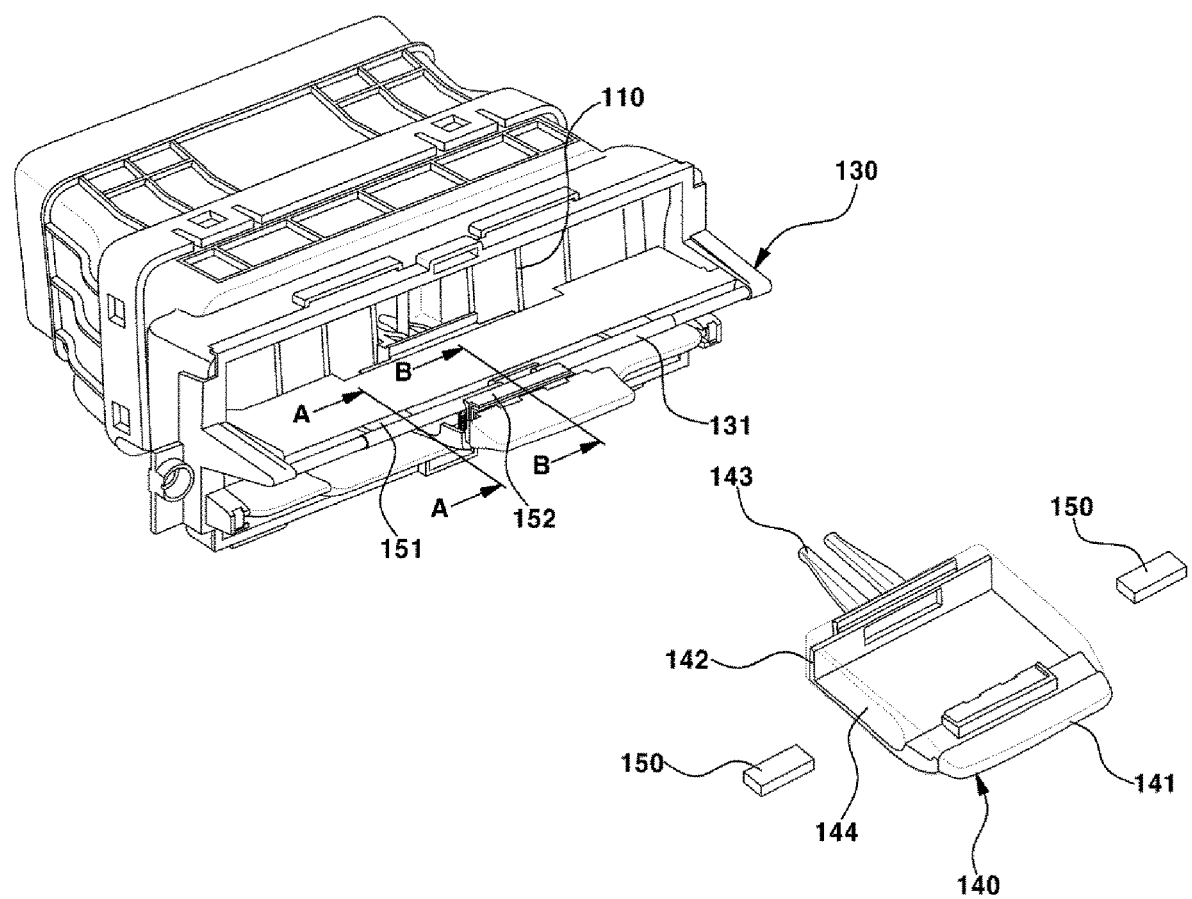
FIG. 3A a diagram illustrating a configuration of a knob of the air vent device according to one embodiment of the present disclosure.

More specifically, as shown in FIG. 3A, an inner end of the knob 140 includes the engagement part 143 so as to be engaged with the second wing 160 located in the vertical direction. More preferably, at least one plate constituting the second wing 160 is configured to be engaged with the engagement part 143 located at the inner end of the knob 140. Accordingly, the first wing 120 configured in the lateral direction is operated in response to a vertical movement of the knob 140, and the second wing 160 configured in the vertical direction is operated in response to a lateral movement of the knob 140.

The knob 140 may include a first wing knob 141 and a second wing knob 142 and include a configuration of a recessed part 144 formed to surround the first wing 120, the central part 131 of the grille unit 130, and the deco part 210.

Further, a rubber 150 configured to remove a vibration and a step generated due to the vertical and lateral movements of the knob 140 may be included in an inner side of the recessed part 144.

Figure 3B:
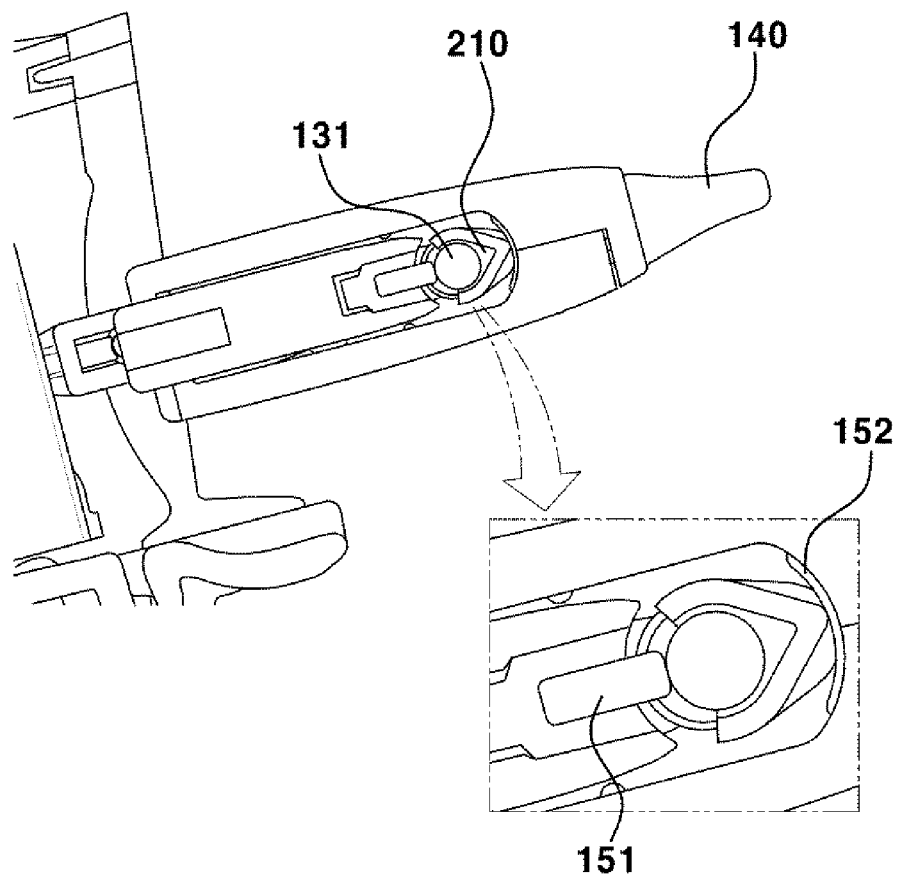
FIG. 3B is a diagram illustrating a configuration of a first rubber pad of the air vent device according to one embodiment of the present disclosure.
Figure 3C:
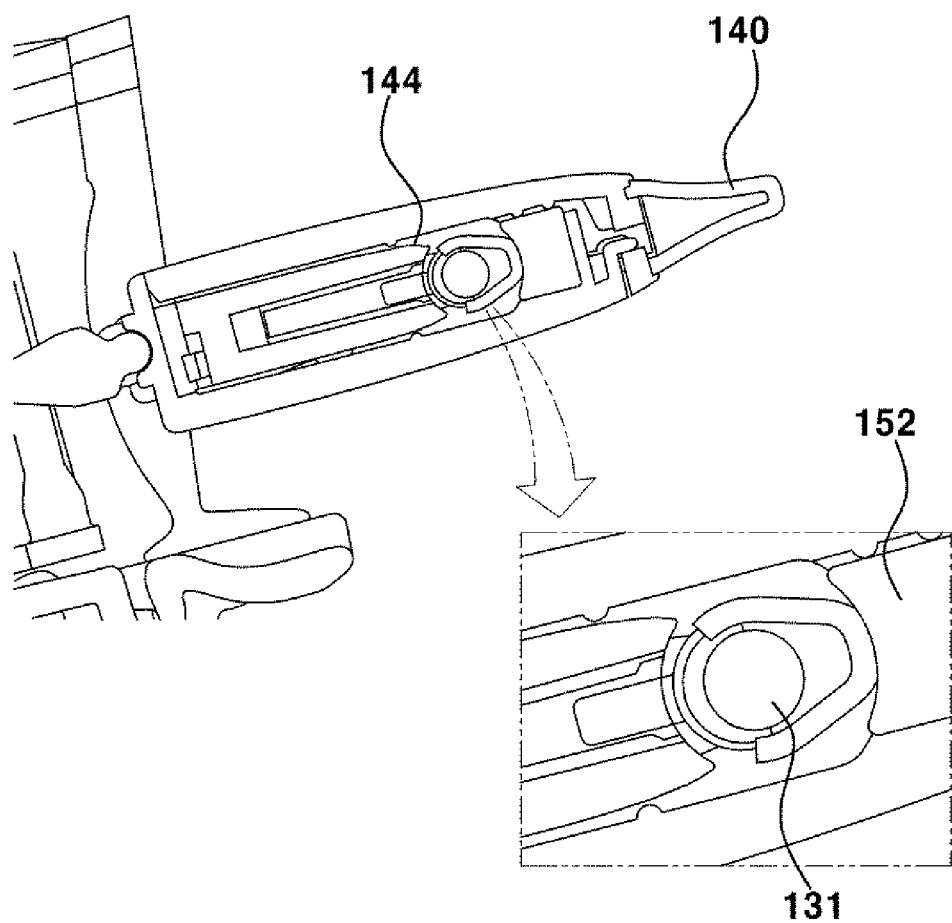
FIG. 3C is a diagram illustrating a configuration of a second rubber pad of the air vent device according to one embodiment of the present disclosure.

As shown in FIG. 3B, the rubber 150 includes a first rubber pad 151 configured to face the central part 131, and, as shown in FIG. 3C, the rubber 150 includes a second rubber pad 152 configured to be located between the deco part 210 and the central part 131.

The first rubber pad 151 may be configured to alleviate an impact generated between the central part 131 and the engagement part 143 and apply an operating force, and the second rubber pad 152 may be configured to adjust the operating force between the deco part 210 and the central part 131.

More preferably, one or more rubber 150 may be configured inside the recessed part 144 in the vertical or lateral direction.

Figure 4A:
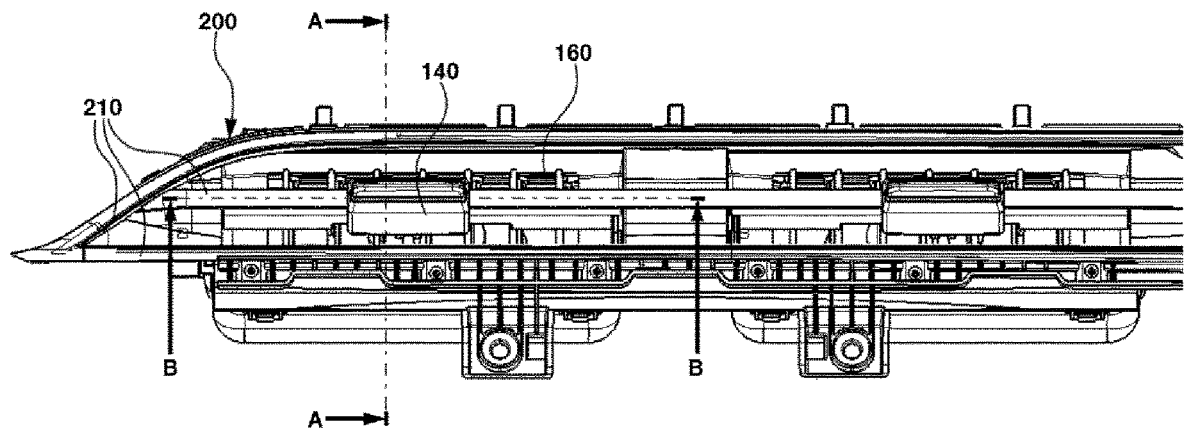
FIG. 4A is a coupling view of the air vent device according to one embodiment of the present disclosure.

FIG. 4A illustrates the garnish 200 located to surround an outer surface of the air vent hole assembly 100 and is a front view of the configuration of the air vent device.

The deco part 210 of the present disclosure is configured to surround the opening which is configured to expose the air vent hole assembly 100 on an outermost surface of the garnish 200. Further, the deco part 210 is configured to be located across the opening in the lateral direction so as to surround the exposed surface of the first wing 120.

More preferably, the deco part 210 of the present disclosure is configured to continuously extend to both side surfaces of the garnish 200. Thus, in order to provide a continuous aesthetic impression on an inner surface of the vehicle, the deco part 210 is configured to continuously extend along a crush pad and an inner surface of a door.

A portion of the deco part 210 located in the opening may be configured to be inserted into the recessed part 144 of the knob 140. More preferably, a separation line of the deco part 210 comprised of two separated portions and the deco part 210 may be located such that an engagement end configured to be fixed to the grille unit 130 is not exposed to the outside.

Preferably, the deco part 210 of the present disclosure configured in the opening may be comprised of two separated portions which are continuously connected to each other to extend in the lateral direction. The deco part 210 comprised of the two separated portions may be configured to be engaged with the grille unit 130 through screw coupling, and the separation line located when the two separated portions are coupled may be configured to be located inside the recessed part 144 of the knob 140.

More preferably, the deco part 210 may be comprised of the number of separated portions more by two than the number of knob 140 of the air vent device located on the crash pad. Thus, the separation line at which the separated portions are connected to each other may be configured to be located on the inner surface of the knob 140.

According to another embodiment of the present disclosure, a deco part 210 comprised of six separated portions according to four knobs 140 located on the crash pad may be included. Thus, separation lines of the deco part 210, each of which are continuously connected, are configured to be located in recessed parts 144 inside the four knobs 140 and to not be exposed to the interior space of the vehicle.

Further, the configuration of the deco part 210 may be continuously configured at the same height on the inner surface of the door of the vehicle.

Figure 4B:
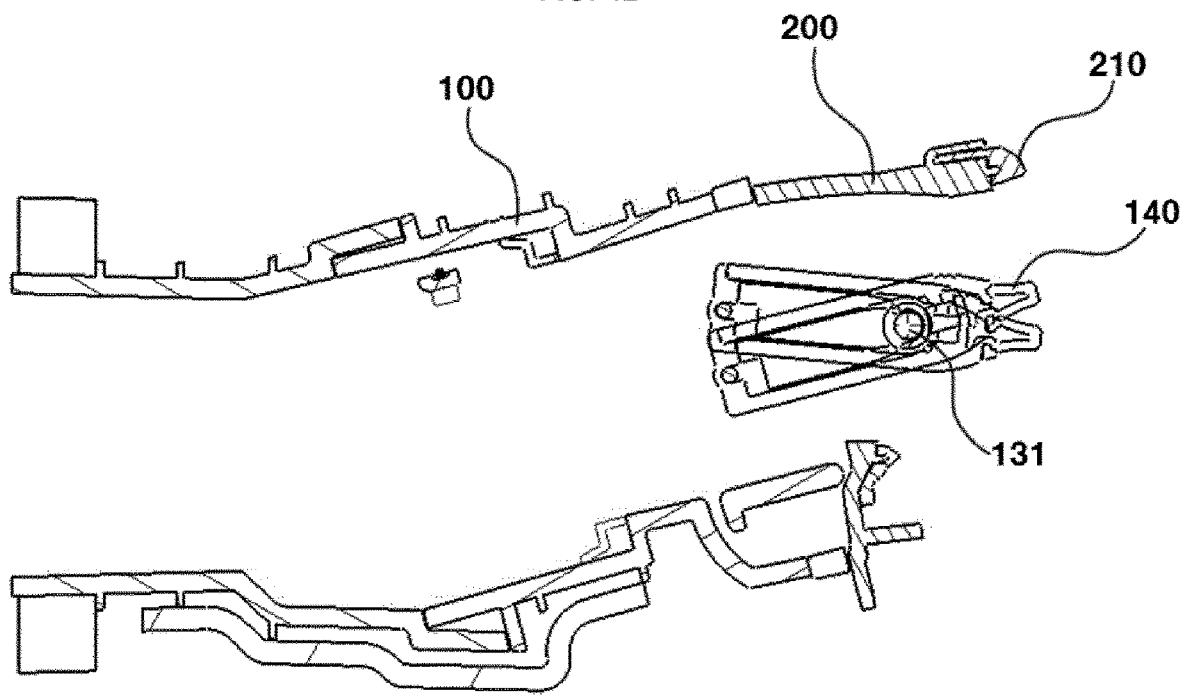
FIG. 4B is a cross-sectional view taken along line A-A of FIG. 4A of the air vent device according to one embodiment of the present disclosure.

As shown in FIG. 4B, the knob 140 is configured to be engaged with at least one plate constituting the first wing 120, and the first wing 120 is configured to face the central part 131 of the grille unit 130. Preferably, the insertion part 121 of the first wing 120 is engaged with the central part 131 of the grille unit 130 and is configured to be pivoted, as a rotational axis of the first wing 120, on an inner surface of the first wing 120 according to the vertical movement of the knob 140.

The garnish 200 is configured to surround an outermost surface of the air vent hole assembly 100 and includes the deco part 210 located on a distal end of the garnish 200. The deco part 210 includes an outer portion configured to surround the opening of the garnish 200 and a central axis portion located to cross the opening in the lateral direction.

The central axis portion is configured such that the central part 131 of the grille unit 130 is located inside the central axis portion, and the central axis portion is fixed to the grille unit 130 through a through-hole located in at least a portion of the central axis portion.

The central axis portion of the deco part 210 may be configured to surround at least a portion of the central part 131, configured to extend in an interior direction of the vehicle along the central part 131, and configured to lower a height of a cross section of the deco part 210 toward the interior direction of the vehicle.

More preferably, in one embodiment of the present disclosure, the deco part 210 is configured to surround at least a portion of the central part 131 of the grille unit 130 and include a protruding shape to extend from the central part 131 to a vertex spaced apart from the rear side of the vehicle. That is, the cross section of the deco part 210 is configured such that a height (width) of the cross section thereof becomes lower (narrower) toward the rear side of the vehicle.

Further, the knob 140 includes the recessed part 144 configured to surround both of the central part 131 of the grille unit 130 and the central axis portion of the deco part 210. Therefore, even when the knob 140 is moved vertically, the exposed surface of the deco part 210 exposed to the opening may be kept constant.

In summary, the first wing 120 is configured to be pivoted based on the central part 131 of the grille unit 130 according to the movement of the knob 140, and the deco part 210 configured to be fixed to an outer surface of the grille unit 130 includes the exposed surface irrelevant to the movement of the first wing 120.

More preferably, the first wing 120 is configured to be pivoted based on the central part 131. Thus, the insertion part 121 engaged with the grille unit 130 may be configured to be moved along an outer surface of the central part 131 to be pivoted in the vertical direction of the first wing 120.

Figure 4C:
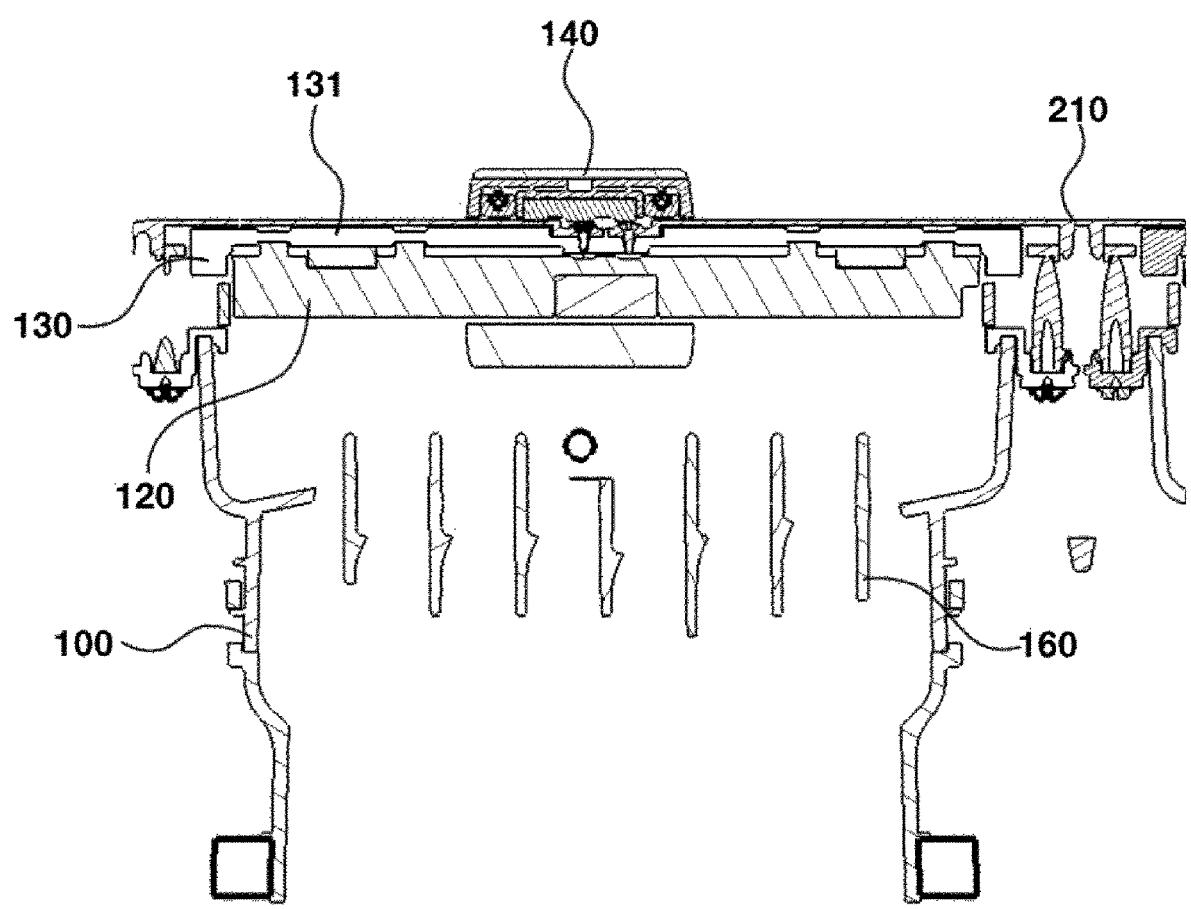
FIG. 4C is a cross-sectional view taken along line B-B of FIG. 4A of the air vent device according to one embodiment of the present disclosure.

FIG. 4C illustrates a cross-sectional view taken along line B-B in FIG. 4A of the air vent device of the present disclosure.

As shown in FIG. 4C, the air vent device includes the second wing 160 located on an inner surface of the air vent hole 110, and the second wing 160 is configured to be engaged with the engagement part 143 of the knob 140 to be pivoted in the lateral direction in response to the lateral movement of the knob 140.

Further, the garnish 200 is configured to surround a distal end of the air vent hole 110 on the outer side of the air vent hole 110, and the deco part 210 is configured to be included at an outer side of the garnish 200. Thus, the deco part 210 is exposed in the form of being fixed to an interior of the vehicle.

The deco part 210 may be configured to be engaged with the grille unit 130 through a bolt (not shown). A position of the bolt engagement may be configured at a position overlapping the knob 140. Therefore, a coupling relationship of the deco part 210 is configured to not be exposed to the interior of the vehicle.

As described above, according to the present disclosure, the central axis portion of the deco part 210 located in the garnish 200 is provided, and the central axis portion is located to be fixed to the grille unit 130. Thus, the configuration of the deco part 210, in which the surface of the deco part 210 exposed to the interior of the vehicle is constantly maintained even in operating state of the first wing 120 and the second wing 160, is provided.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to make alternations or modifications without departing from the scope of the present disclosure disclosed in the present specification, equivalents, and/or within the technical or knowledge scope in the art to which the present disclosure pertains. The described embodiments are intended to illustrate the best mode for carrying out the technical spirit of the present disclosure and various modification can made in the specific applications and uses of the present disclosure. Therefore, the detailed description is not intended to limit the present disclosure as in the disclosed embodiments. Further, it should be construed that the appended claims are intended to include another embodiment.

The invention claimed is:

1. An air vent device of a vehicle, comprising:
   a garnish including an opening in which an air vent hole is located;
   a grille unit located between an outer surface of the air vent hole and an inner surface of the garnish;
   a first wing located at an outer side of the air vent hole in one direction and configured to be pivoted based on one end of the grille unit;
   a deco part located on an outer surface of the garnish; and
   a knob configured to control a direction of a wind discharged from the air vent hole;
   wherein separation lines formed between a plurality of separated portions constituting the deco part are configured to be located inside the knob.

2. The air vent device of claim 1, wherein the knob is configured to be engaged with a second wing located inside the air vent hole in a direction crossing the first wing.

3. The air vent device of claim 2, further comprising:
   an engagement part located on an inner side of the knob,
   wherein the engagement part is configured to be coupled to a portion of the second wing.

4. The air vent device of claim 1, wherein the deco part is configured to surround at least a portion of an outermost surface of the first wing.

5. The air vent device of claim 1, further comprising:
   an insertion part located on the outermost surface of the first wing,
   wherein a central part of the grille unit is configured to be inserted into and engaged with the insertion part.

6. The air vent device of claim 5, wherein the first wing is configured to be pivotable based on the central part.

7. The air vent device of claim 5, wherein the knob is located to surround the central part and a portion of the deco part located in the opening.

8. An air vent device of a vehicle, comprising:
   a garnish including an opening in which an air vent hole is located;
   a grille unit located between an outer surface of the air vent hole and an inner surface of the garnish;
   a first wing located at an outer side of the air vent hole in one direction and configured to be pivoted based on one end of the grille unit;
   a deco part located on an outer surface of the garnish; and
   a knob configured to control a direction of a wind discharged from the air vent hole,
   wherein a width of a cross section of the deco part configured to extend from an outermost surface of the first wing is configured to be narrow along a direction in which the deco part extends; and wherein separation lines formed between a plurality of separated portions constituting the deco part are configured to be located inside the knob.

9. The air vent device of claim 8, further comprising:
an insertion part located on the outermost surface of the first wing,
wherein a central part of the grille unit is configured to be inserted into and engaged with the insertion part.

10. The air vent device of claim 9, wherein the first wing is configured to be pivotable based on the central part.

* * * * *